United States Patent [19]

Wong et al.

[11] Patent Number: 5,717,777
[45] Date of Patent: Feb. 10, 1998

[54] LONGEST LINE METHOD AND APPARATUS FOR FINGERPRINT ALIGNMENT

[75] Inventors: John Douglas Evan Wong; Laurence Hamid; Michael Andrew Borza, all of Ottawa, Canada

[73] Assignee: Dew Engineering and Development Limited, Ottawa, Canada

[21] Appl. No.: 585,349

[22] Filed: Jan. 11, 1996

[51] Int. Cl.[6] .................................................. G06K 9/80
[52] U.S. Cl. .................................................. 382/124
[58] Field of Search .............................. 382/116, 124, 382/125, 126, 127; 283/68, 69; 356/71; 340/825.34

[56] References Cited

U.S. PATENT DOCUMENTS

| | | | |
|---|---|---|---|
| 4,607,384 | 8/1986 | Brooks | 382/124 |
| 4,790,564 | 12/1988 | Larcher et al. | 283/69 |
| 5,040,224 | 8/1991 | Hara | 382/124 |
| 5,054,089 | 10/1991 | Uchida et al. | 382/127 |
| 5,109,428 | 4/1992 | Igaki et al. | 382/125 |
| 5,337,369 | 8/1994 | Shibuya | 382/125 |
| 5,497,429 | 3/1996 | Shibuya | 382/125 |
| 5,552,766 | 9/1996 | Lee et al. | 340/541 |

FOREIGN PATENT DOCUMENTS

| | | |
|---|---|---|
| 1317376 | 4/1993 | Canada. |
| 60-84677 | 5/1985 | Japan. |

*Primary Examiner*—Leo Boudreau
*Assistant Examiner*—Brian P. Werner
*Attorney, Agent, or Firm*—Neil Teitelbaum & Associates

[57] ABSTRACT

A non-minutia method and apparatus for comparing a reference fingerprint image to a candidate fingerprint image are disclosed. During enrollment of a reference image, a unique reference set of data is generated in a reference coordinate system by placing a group of line segments on the reference image. A collection of constraints is used for defining the subspace for each line of the reference group. A similar set of candidate line segments is constructed on the candidate fingerprint image in a candidate coordinate system. A candidate set of data is determined and then compared with the reference set of data using translation and rotation of the coordinate systems. Tolerances of the comparison are also provided for.

9 Claims, 7 Drawing Sheets

LONGEST LINE METHOD AND APPARATUS FOR FINGERPRINT ALIGNMENT

FIELD OF THE INVENTION

This invention relates to a method and apparatus for fingerprint alignment and in particular to a method and apparatus that compares reference fingerprint data with a candidate fingerprint using a set of line segments.

BACKGROUND OF THE INVENTION

Asserting the identity of an individual is a common problem of highly protected areas. There are many accepted ways to establish a person's identity, generally by comparing a particular characteristic unique to that person with the same characteristic obtained in advance when the person first receives access to the protected area. In this disclosure the term "protected area" is used for designating various facilities, buildings, as well as databases, computer networks, etc.

Physical characteristics such as fingerprints have been extensively used for identification. Their use as such is practically and socially accepted. It is a recent trend that a fingerprint is processed to be automatically identified by a recognition technique using electronic means. Automatic identification of a fingerprint is made with reference to abrupt endings, bifurcations and branches which are extracted from a fingerprint image and which may be collectively called "minutiae". In order to accurately collate the fingerprint, it is known to detect directions of ridges of the fingerprint and to decide a position of a "core" of a fingerprint prior to identification by use of minutiae. Detection of directions and decision of the position of the core of the fingerprint will be referred to as preliminary processing.

The automatic "matching" of fingerprints is the process of comparing two different fingerprints to determine if they came from the same finger, and thus from the same person. The automatic "identification" of a fingerprint is the process of comparing a live fingerprint, called also a "candidate print" to a print in the database, called also "reference print".

One problem encountered in the identification-authorization process is the different quality of the reference image as compared with the live image. Generally, the quality of the live fingerprints is rather poor due to uneven pressure applied by the finger on the pick-up plate. This results in gray areas in the live image and an accurate identification is therefore difficult. On the other hand, reconstructing fingerprint images of higher quality affects dramatically the price of the reader and the digital system necessary to effect the comparison.

Another problem is the large memory space necessary for storing the entire image. As well, a digital matching of the entire image of the reference print with the live print affects drastically the cost of the digital system necessary to effect the comparison.

As a result, the matching operation is advantageously performed on the minutiae of the fingerprint, instead of on the entire image of the fingerprint itself. Current fingerprint databases include alphanumeric data, for example the name and/or another ID associated with a digitized sequence of minutiae or other picture specific (unique) elements of the fingerprint, or more precisely a set of points tied to an orthogonal reference coordinate plan. A live fingerprint is scanned whenever a person is requesting access to the protected area, the image so obtained is processed to produce live coordinate points for the minutiae of the live print, the reference coordinates are retrieved from the data base, based on the personal ID, and then the reference and live sets of points are compared to allow or disallow access of that person. It can be seen that selecting a comprehensive set of points is a major problem in the art of automatic fingerprint identification systems, since the selected points must sufficiently characterize a fingerprint to make an accurate identification. Still another problem to overcome is that the orientation, in other words the coordinate system, of the live print is generally not known with accuracy. This means that the live image, or more precisely the coordinate system of the live image must be subjected to a translation and a rotation before the comparison is initiated, for aligning the reference coordinate system with the live coordinate system.

A fingerprint identification process is disclosed in U.S. Pat. No. 5,054,089 (Uchida et at., date Oct. 1, 1991, assigned to Fujita Limited). This patent relates to a two-stage position alignment system including a rough position alignment followed by an accurate position alignment. Uchida generates an analog signal that uniquely characterizes a fingerprint. This analog signal is obtained by addition of the pixel densities of the image of an entire finger, in a direction perpendicular to the longitudinal direction of the finger, is digitized and stored against the person's ID.

It is common in the art of fingerprint identification to use pattern recognition techniques to determine the fingerprint "core" as described in Japanese Patent Publication 58-55549. However, it is to be noted that for some fingerprint patterns as arches, loops, or whorls it is difficult to determine the core of the fingerprint image. Moreover, as unclear portions of the live image occur quite frequently, longer time for aligning and confirmation of each point of the core is necessary.

U.S. Pat. No. 5,040,224 (Hara, dated Aug. 13, 1991, and assigned to NEC Corporation) discloses a fingerprint image processing system for detecting the position of the core in a fingerprint image by associating a direction and a curvature to each ridge and using statistical analysis and a probability thesaurus.

The credit card industry in the United States transacted about $350 billion in charge volume in 1986, the losses due to fraud being close to $750 million. Stolen cards make generally 20% of this loss. A substantial mount of money is spent by police forces in various countries in an effort to stop interstate and intercontinental broadscale criminal activities and to protect cardholders. Incorporation of photographs, as is currently used on passports and it will be soon used on the cards, does not allow for positive identification. This is because visual identification of an individual by an ID type photograph can not be accurate and furthermore, appearances can be altered to match the photograph in the card. Cards or passports can be forged with a photo of an illegal user.

Fingerprints are unique to each individual and thereby constitute positive verification.

Fingerprints are more secure than passwords/access cards which are currently used. In addition, fingerprints may be used for identification of an authorized user of an area that must be maintained for both access and charge. These areas may be databases, private/public computer networks, highly secured premises and the like.

Still another use of an identification/validation based on fingerprint images is matching a fingerprint discovered at a crime site with a fingerprint database.

There is a need to provide an automatic fingerprint identification system capable of accurately identifying a person, which system uses a simple and acceptable complete set of points of comparison between a reference and candidate fingerprint/s. There is also a need for a system that will allow for an acceptable compensation for the quality of the live prints being evaluated.

To date, the methods suffer from a number of disadvantages, among which is a high degree of inaccuracy in a real environment. Mismatch may occur because the misalignment between the reference and live images, caused for example by a slight rotational movement of the finger when the live image is scanned.

As well, the prior art systems fail to consider the type of points being compared in the course of the matching operation, in that they do not account if the minutiae currently under consideration is a bifurcation or an ending, which increases the time spent by the system and also decreases the reliability of the system.

SUMMARY OF THE INVENTION

It is an object of the present invention to provide a method and an apparatus that overcomes totally or in part the drawbacks associated with the prior art automatic fingerprint identification systems.

It is another object of this invention to provide an improved method and apparatus for comparing a reference image of a fingerprint with a candidate image using sets of line segments.

Still another object of this invention is to provide a method and apparatus that can validate a candidate fingerprint image without determining the core of the fingerprint.

The present invention may be used in numerous applications, from simple validation of the identity of, for example, a holder of a magnetic stripe card, passports or writer of a document, to detecting an unidentified fingerprint in a large database.

According to this invention, a method for determining if a candidate image of a live fingerprint corresponds to a reference set of metrics for a stored fingerprint, comprises the steps of capturing a candidate image of a fingerprint; retrieving said reference set of metrics and generating a group of reference line segments on a predetermined space on the candidate image and measuring a candidate set of metrics; and comparing the reference set &metrics with the candidate set of metrics and determining within predetermined tolerances if the reference image and the candidate image are substantially similar.

According to another aspect of this invention, a method is provided for enrolling a fingerprint image in a reference storage, comprising the steps of scanning the fingerprint to obtain a reference image in a reference coordinate system and storing the reference image in the reference storage; selecting a first and a second constraint and defining a space on the fingerprint image; defining a first subspace on the space and generating a first line segment within the first subspace in accordance with a third constraint; measuring a first reference set of metrics for the first line segment, determining a fourth constraint using the first constraint and the first reference set of metrics, and defining a second subspace on the space according to the fourth constraint; generating a second line segment within the second subspace according to the third constraint; measuring a second reference set of metrics for the second line segment, determining a fifth constraint from the second reference sets of metrics and the first constraint, and defining a third and a fourth subspace on the space according to the fourth and fifth constraints; generating a third line segment within the third subspace according to the second, fourth, and fifth constraints, and the first set of reference metrics; generating a fourth line segment within the fourth subspace according to the second, fourth, and fifth constraints, and the second set of reference metrics; and storing the first to fourth reference sets of metrics in the reference storage.

In accordance with the invention there is further provided a method of determining if an image of a fingerprint of a candidate corresponds to stored fingerprint data comprising the steps of: capturing an image of a fingerprint, the image of the fingerprint including a plurality of ridges and valleys; comparing a plurality of straight lines that are derived from the captured image with the stored fingerprint data, each straight line being a line of maximum length that fits between two adjacent ridges without crossing either of the two ridges; and, determining within predetermined limits if there is a suitable match between the plurality of straight lines and a record within the stored fingerprint data, wherein a record represents stored information related to a single user.

According to still another aspect of the invention, a method for validating identity of a person is provided, including the steps of providing a reference storage for recording a reference group of line segments and a respective reference set of metrics; scanning and processing a candidate fingerprint to prepare a candidate image in a candidate coordinate system; retrieving the reference set of metrics from the reference storage; generating a candidate group of line segments from the reference set of metrics in a reference coordinate system and measuring a candidate set of metrics for the candidate group of line segments; translating and rotating the candidate coordinate system to overlap with the reference coordinate system and comparing the candidate set of metrics with the reference set of metrics; and validating the identity when the candidate set of metrics substantially corresponds with the reference set of metrics.

According to still another aspect of this invention, an apparatus is provided for controlling access to a protected area by scanning a fingerprint, comprising: an image processing block for receiving an image and associating the image with a coordinate system; a subspace selection block for receiving the image and defining a subspace; a line segment generator for generating a first group of line segments on the subspace; a metrics measurement block for determining a first set of metrics for the group of line segments; a constraint block for processing a plurality of initial constraints and the first set of metrics, forming a collection of constraints, and applying the collection of constraints to the line segment generator; a reference storage for forming a record including the first set of metrics; and a processing unit for controlling and monitoring functionality of the subspace selection block, the line segment generator, the reference database, the constraint block, and the metrics measurement block.

Advantageously, the method and apparatus of this invention do not require a high quality image for an accurate identification. Reliable fingerprint validation is obtained through generation of personalized sets of line segments, even when a low quality pit is available.

Another advantage of this invention is that the system allows a tradeoff between the accuracy of the orientation and image distortion caused by changes in the user's placement of the finger on the scanning plate.

BRIEF DESCRIPTION OF THE DRAWINGS

The foregoing and other objects, features and advantages of the invention will be apparent from the following more particular description of the exemplary embodiments of the invention, as illustrated in the appended drawings, where.

DESCRIPTION OF THE PREFERRED EMBODIMENT

The longest line method according to this invention may be used to locate, orient and provide initial comparison of a reference image to a candidate image. A reference image of a fingerprint is defined herein as an image of a fingerprint that was enrolled at a given time, while a candidate image of a fingerprint is an image that is currently under consideration, namely the image of a "live" fingerprint currently obtained from a scanner. Subsequent processing is then used to complete comparison of the candidate print to the reference print to determine whether a match exists.

This method involves generating a small set of line segments on the reference fingerprint image during enrollment of the reference image. When comparing a candidate image with the reference image, a similar set of line segments is constructed on the candidate image, if possible; inability to construct a similar set of lines on the candidate image results in a failed match.

Figure 1:
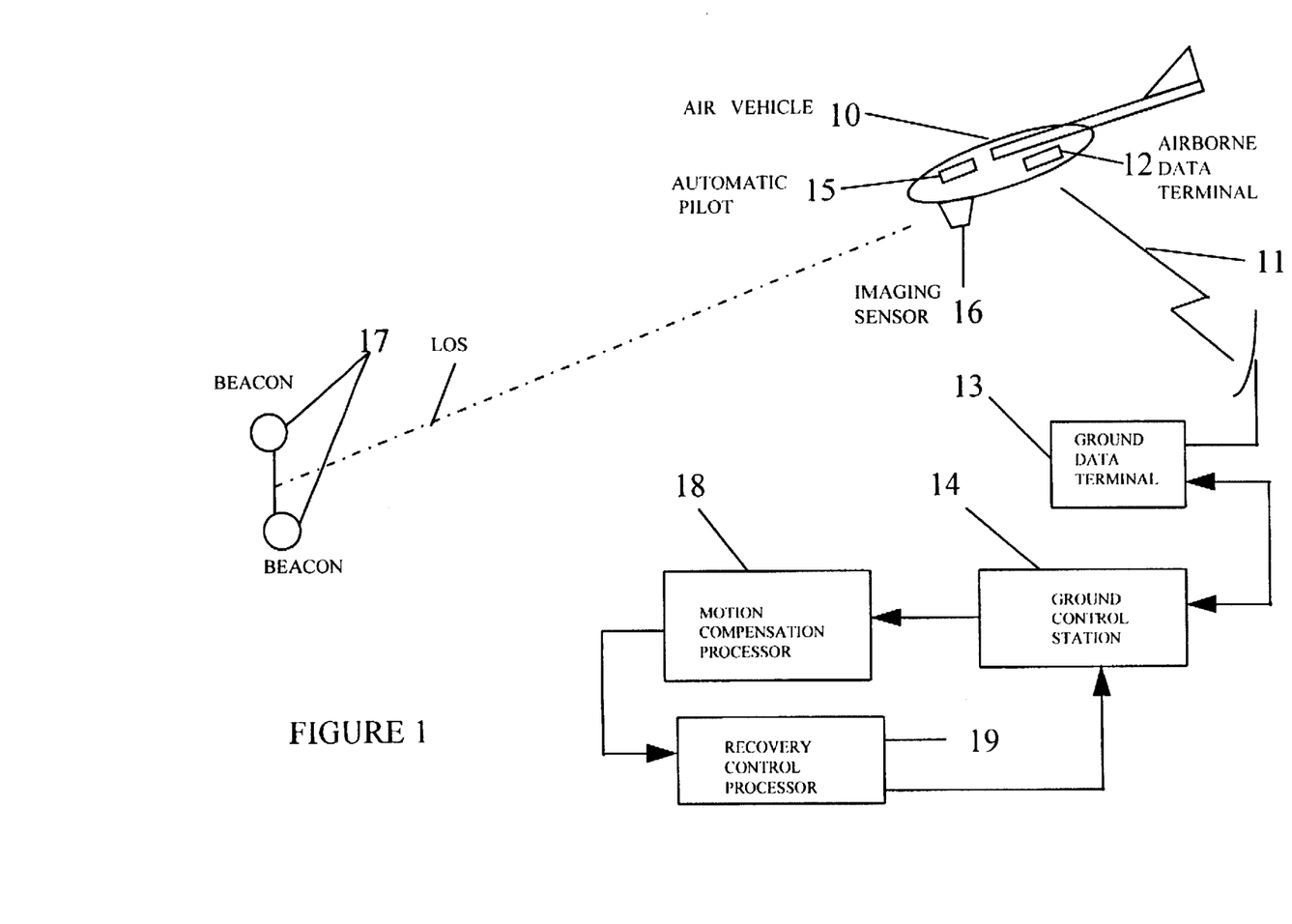
FIGS. 1a, 1b and 1c illustrate various types of fingerprints.
Figure 1A:
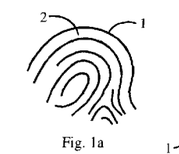
Figure 1B:
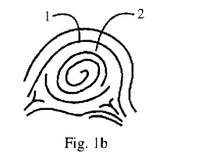
Figure 1C:
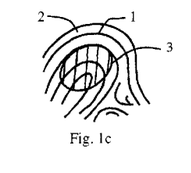

FIGS. 1a to 1c illustrate various types of fingerprints used for a better understanding of the invention. Heuristically, two complementary spaces are defined on the fingerprint image. These are "ridge space", the space occupied by ridges in the fingerprint image, and "groove space", the space occupied by grooves in the fingerprint image. It is shown that ridges 1, which appear on the image in black are separated by grooves 2. FIG. 1a illustrates a loop type fingerprint specified by ridges making backward turns. The fingerprint illustrated in FIG. 1b is of a whorl type, identified by a central ridge mined to form at least a circle. FIG. 1c shows a fingerprint for which the core positions is difficult to locate.

Figure 2:
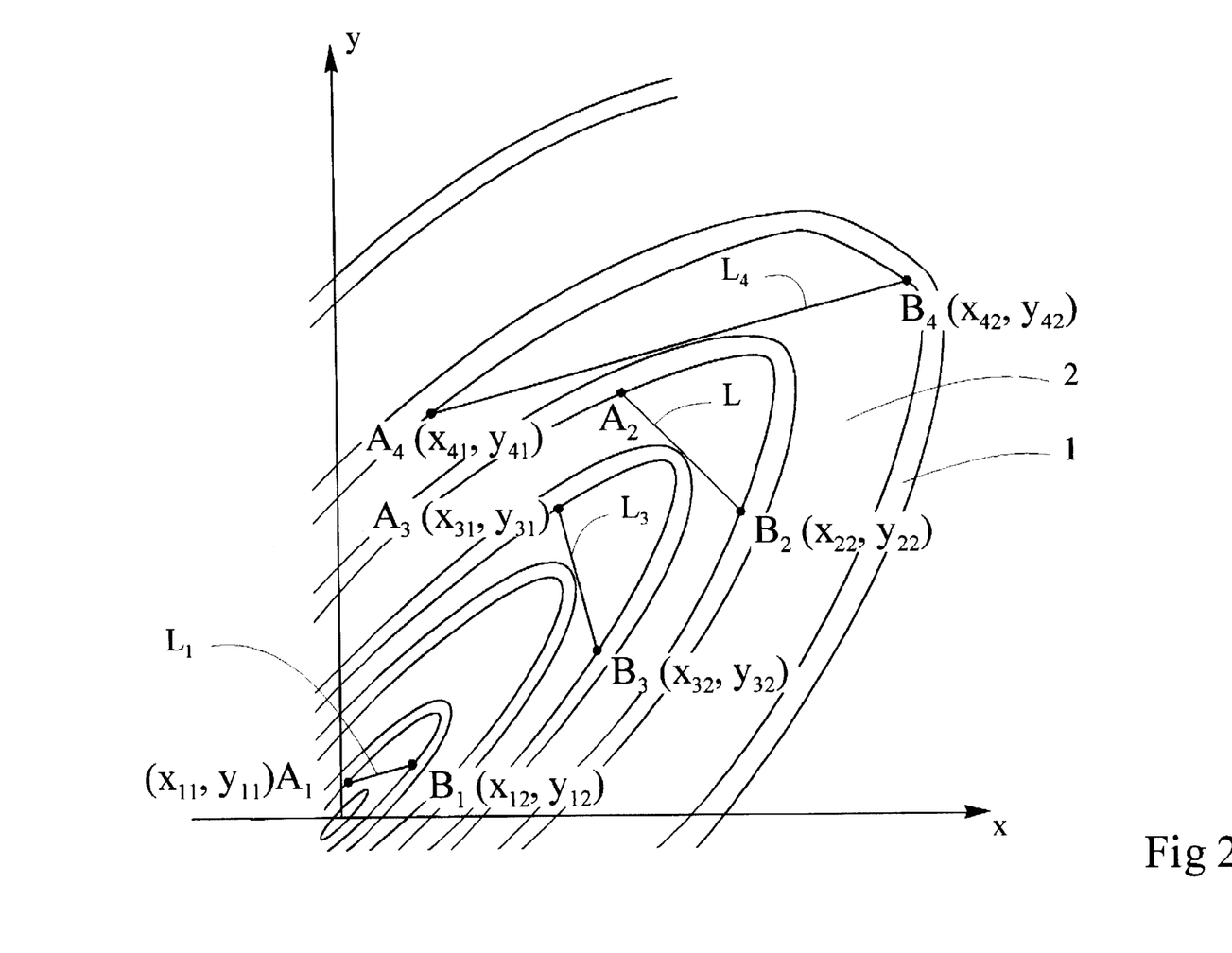
FIG. 2 illustrates an example of the selection of four line segments according to this invention.

Considering empirical observation, two to four line segments have been found to provide sufficient data to make an initial comparison. Let the first line segment be denoted by $L_1$, the second, the third and the fourth be $L_2$, $L_3$, $L_4$, respectively. FIG. 2 illustrates a fingerprint placed in an orthogonal system of coordinates with four line segments, each defined by end points $A_i=(x_{i1}, y_{i1})$ and $B_i=(x_{i2}, y_{i2})$, where i takes integer values between 1 and 4. Similar sets of line segments are selected on both the reference image and candidate image.

Let N={1, 2, ... n} where e.g., $2 \leq n \leq 4$. Mathematically, each line segment $L_i$ may be defined on the real plane $R^2$ as follows:

$$L_i = \{\vec{x}\} | \vec{x} = \vec{A}_i + \alpha(\vec{A}_i - \vec{B}_i), \alpha \in [0,1]$$

where $A_i=(x_{i1}, y_{i1})$ and $\vec{B}_i=(x_{i2}, y_{i2})$ are the start and end points of line segment $L_1$.

According to the invention only line segments that are located entirely within the groove space or ridge space, are considered for identification, i.e. no segment may cross a groove-ridge boundary. In other words, end points $A_i=(x_{i1}, y_{i1})$ and $B_i=(x_{i2}, y_{i2})$ are selected in a groove i, on the line separating the groove of interest from the surrounding ridge. A set $S_T$ is defined to be the set of all possible line segments satisfying this constraint. A subset is defined as the group of line segments all located in groove space, ridge spaces, or in any combination of the two. It has been observed that selection of subsets entirely in groove space is preferable, as pores in the fingerprint image do not contribute noise to the image. In this disclosure and claims, the term predetermined space is used to define the plurality of the grooves in the core area of a fingerprint. FIG. 2 shows the line segments placed entirely into grooves 2.

A reference set $S_T$ is chosen from $S_T$ on the reference image:

$$S_R = \{L_i | i \in N\} \subset S_T$$

Figure 3:
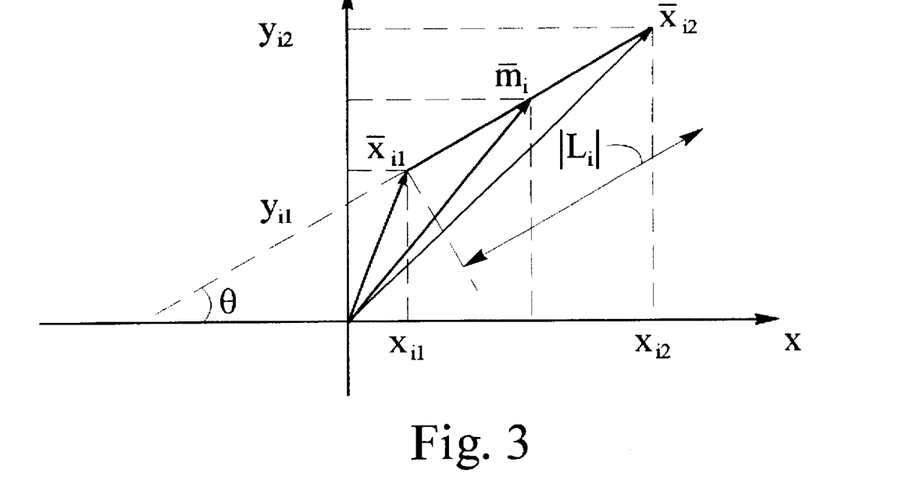
FIG. 3 shows the metrics used for defining a fingerprint.

Some useful metrics are now defined and illustrated in FIG. 3 for line segment $L_i$, but the method disclosed herein is not limited to using these metrics. These are Euclidean norm $|L_i|$ of the angle $\theta_i$ that a segment makes with respect to the x-axis, and the midpoint $\vec{m}_i$ with respect to the origin:

$$|L_i| = |\vec{A}_i - \vec{B}_i|$$

$$\theta_i = \tan^{-1}\left(\frac{y_{i2} - y_{i1}}{x_{i2} - x_{i1}}\right)$$

$$\vec{m}_i = \frac{(\vec{A}_i + \vec{B}_i)}{2}$$

A line segment is entirely defined in the orthogonal system (x, y) by the length of the segment $L_i$, angle $\theta_i$ and vector $\vec{m}_i$. The metrics for each line segment are stored in the reference memory against the person's identity data, so that it can be used whenever the person requests access to the protected area.

In order to obtain a set of lines that sufficiently describe the fingerprint for identification, each of the line segments is constructed in different ways using the metrics. The idea is to distribute fine segments over the core of the reference fingerprint image, as shown in FIG. 2, making moderately large angles with respect to each other. This provides a set of features that may be quickly and accurately located and oriented.

Figure 4A:
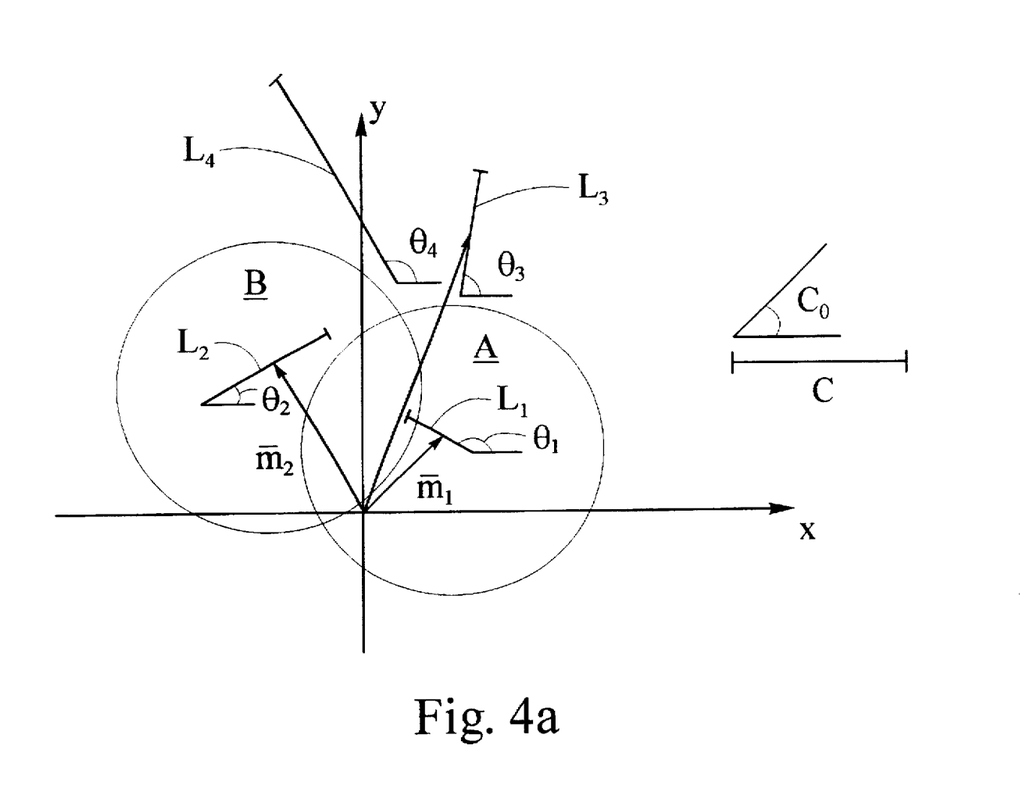
FIG. 4a shows the constraints used for selecting the line segments.
Figure 4B:
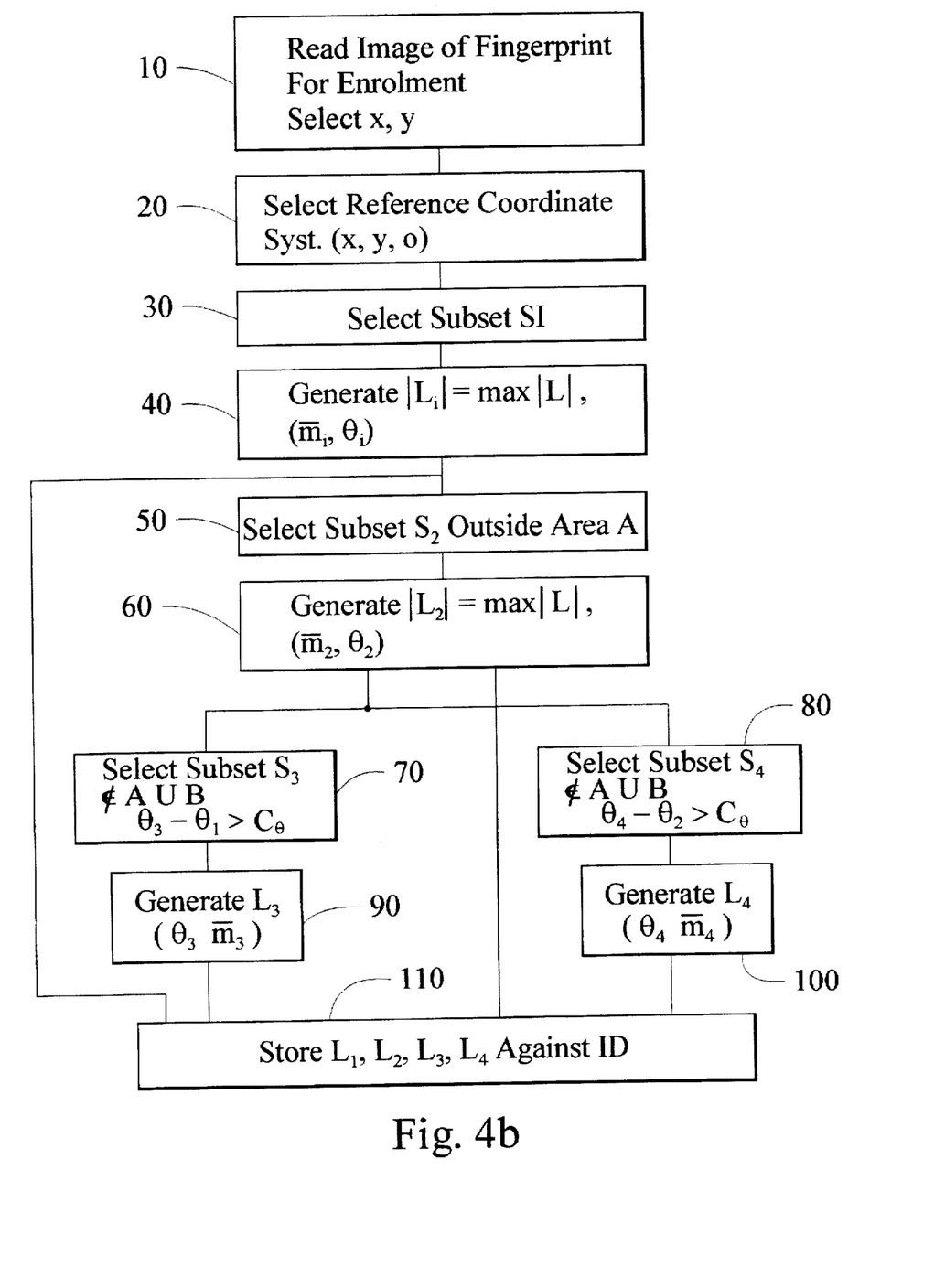
FIG. 4b is a flowchart of a method of enrollment of a fingerprint.

FIG. 4a illustrates how the selection of four line segments is effected when constraints C and $C_\theta$ are applied according to this invention, while FIG. 4b illustrates a flowchart of the method of storing a fingerprint as a reference fingerprint. Reference is made in the following description to these figures.

In step 10 the image of a fingerprint is scanned. If the fingerprint is to be enrolled in a database, the identity of the person is also read and stored. The identity may be the person's name, a password, employee's number, or the like. A reference coordinate system (O, x, y) as illustrated in FIG. 4a, is selected and all data for the reference line segments are ascertained in this coordinate system. O is shown to be origin, or the intersection of the x-y axis. Then, according to the method of the present invention, a subset $S_1$ is selected in step 30 to define the subspace for generating the first line segment, i.e. in a first groove. The first groove is selected arbitrarily in the core region of the fingerprint. The primary line segment is constructed on the reference print such that its length $|L_1|$ is a maximum, as shown in step 40:

$$L_1 \in S_1$$

$$S_1 = \left\{ L_j \Big| |L_j| = \max_{L \in S_T} |L| \right\}$$

The selection of the longest line segment $L_1$ is effected automatically from the group of fine segments that may be accommodated in the groove of interest, without crossing any ridge. Then, the coordinates of the median point $\overline{m}_1$ and the angle $\theta_i$ of this line segment are temporarily stored for generating the constraints for the remaining line segments.

In the event that two or more line segments have the same maximum length, i.e. $|S_1|>1$, $L_1$ is chosen arbitrarily from $S_1$.

In step 50 subset $S_2$ is selected, while in step 60 line segment $L_2$ is generated on subset $S_2$, adding the constraints illustrated in FIG. 4a. Thus, while $L_2$ should also lay in a groove, the distance between the tips of vectors $\vec{m}_1$ and $\vec{m}_2$ should be larger than a constant C and the length of the line segment should take a maximum value possible under the circumstances. If a circle of radius C is drawn around the tip of midpoint vector $\vec{m}_1$, the position of the tip of the midpoint vector $\vec{m}_2$ of line segment $L_2$ should be outside area A of the circle. No constraints are forced on angle $\theta_2$. Again, the coordinates of the median point $\overline{m}_2$ and the angle $\theta_2$ of this line segment are used for generating the constraints for the remaining line segments.

$L_2 \in S_2$ and is constructed as:

$$S_2 = \left\{ L_i \Big| |m_j - m_1| > C, |L_j| = \max_{L \in S_T} |L| \right\}$$

As indicated above, this attempts to find $L_2$ on the second subspace, such that it is far from $L_1$ and its length is maximized.

Next, in steps 70 and 80 subsets $S_3$ and $S_4$ are selected and line segments $L_3$ and $L_4$ are generated in steps 90 and 100. Constraints are placed on the tertiary and quaternary line segments $L_3$ and $L_4$ to address similar concerns:

$$S_3 = \{L_j | |\vec{m}_j - \vec{m}_1| > C, |\vec{m}_j - \vec{m}_2| > C, |\theta_j - \theta_1| > C_\theta\}$$

$$S_4 = \{L_j | |\vec{m}_j - \vec{m}_1| > C, |\vec{m}_j - \vec{m}_2| > C, |\theta_j - \theta_2| > C_\theta\}$$

Line segment $L_3$ is generated on a third subspace to be far from line segments $L_1$ and $L_2$, but still in the core, and also in a groove. If a circle with radius C is drawn around the tip of the midpoint vector $\vec{m}_2$, the position of the tip of the midpoint vector $\vec{m}_3$ should be outside both areas A and B. In addition, angle $\theta_3$ of line segment $L_3$ with the x-axis should be selected to give an angle difference $|\theta_3 - \theta_1|$ which is greater than the angle constraint $C_{74}$.

Similarly, $L_4$ is generated on the fourth subspace, to be far from line segments $L_1$ and $L_2$, but be in the core, and in a groove. The position of the tip of the midpoint vector $\vec{m}_4$ should be outside areas A and B, while angle with the x-axis should be selected to give an angle difference $|\theta_4 - \theta_2|$ that is greater than the angle constraint $C_\theta$.

The constraints C and $C_\theta$ are established so that finding a similar set of lines on the live image is less likely to occur on fingerprints of different character. The values of the tolerances are somewhat arbitrary. Empirical studies have given rise to some reasonable values. If average ridge to ridge spacing is $\lambda$, then a reasonable choice for C is $C \geq 10\lambda$. Larger values of C make the image easier to orient accurately; the tradeoff is that a larger imaged area is needed to allow rotation and translation of the finger. A value of $C_\theta = 30°$ forces the primary and tertiary line segments not to occur in parallel grooves, and likewise for secondary and quaternary line segments.

In step 110 the set $S_R$ of constructed line segments is stored as part of the reference print characterization. As indicated above, the storage may be a database, a card, a document, depending on the application.

Figure 5A:
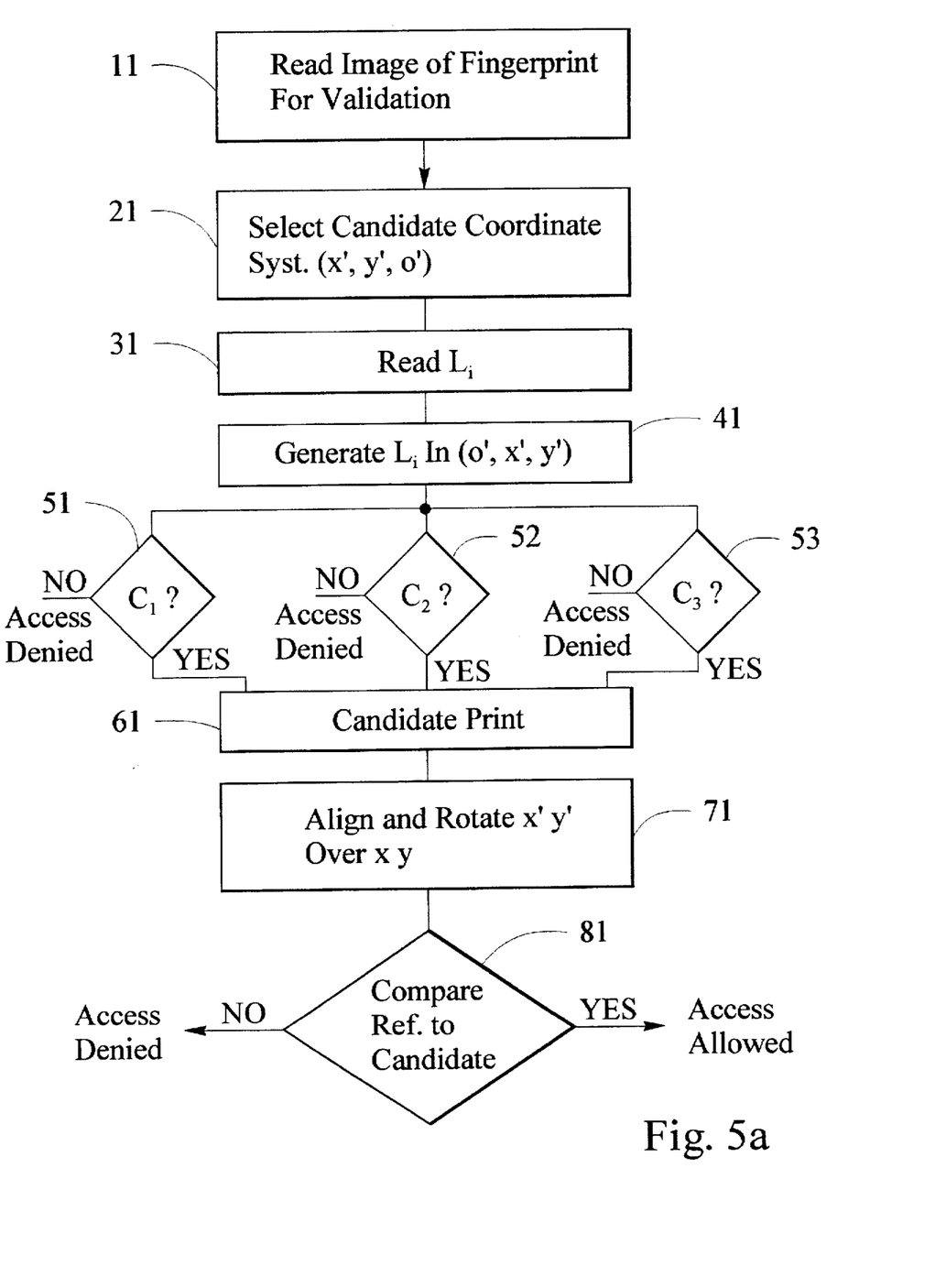
FIG. 5a illustrates the flowchart for the method for validation of a candidate fingerprint.

During verification, which is illustrated in the flowchart of FIG. 5a, a search for similar line segments is performed on the candidate fingerprint image. First, in step 11, the live image is scanned. If the reference fingerprint is pre-stored in a database, the person's ID is entered for accessing the reference print data from the fingerprint database. In step 21, a candidate system of coordinates (O', x', y') is selected and the reference line segments $L_i$ are read in step 31 from the reference fingerprint storage. Then, a set $S_L$ of candidate line segments is generated on the candidate orthogonal coordinate system (O', x', y') in step 41.

Let $S_L = \{L'_i | i \in N\}$ be the set of line segments found on the candidate fingerprint image, with metrics $|L_i'|$, $\overline{m}_i' \theta_i'$ measured for all four candidate lines.

$S_L$ is verified for acceptability in steps 51, 52, and 53, namely conditions are imposed as shown below, to determine if the differences between the metrics of the corresponding reference image and those of the live image are:

$$||L'_i| - |L_i|| < C_1, \ i \in N$$

$$|(\vec{m}'_i - \vec{m}_i) + (\vec{m}_j - \vec{m}'_j)| < C_2, \ i \neq j, \ i, j \in N$$

$$||\theta'_i - \theta_i| - |\theta'_j - \theta_j|| < C_3, \ i \neq j, \ i, j \in N$$

A candidate image has been found in step 61 if the above conditions were complied with. If not, access is denied in that the reference print and the live pit are different.

$C_1$, $C_2$, and $C_3$ are constants which allow tradeoff of orientation accuracy and image distortion caused by changes in the user's placement of the finger on the scanning device between enrollment and validation. Again, empirical study has given rise to the following values for these parameters:

$$C_1 = 2\lambda$$

$$C_2 = 1\lambda$$

$$C_3 = 5°$$

Finally, the alignment and orientation of the reference image to the candidate image is effected in step 71 by the following translation and rotation parameters, where $\vec{\Delta x}$ is the displacement between the origin of reference coordinate systems O and candidate coordinate system O' and $\Delta\theta$ is the angle between the axes x-x' or y-y'.

$$\vec{\Delta x} = \frac{\sum_{i \in N}(\overline{m'_i} - \overline{m_i})}{N}$$

$$\Delta\theta = \frac{\sum_{i \in N}(\theta'_i - \theta_i)}{N}$$

Figure 5B:
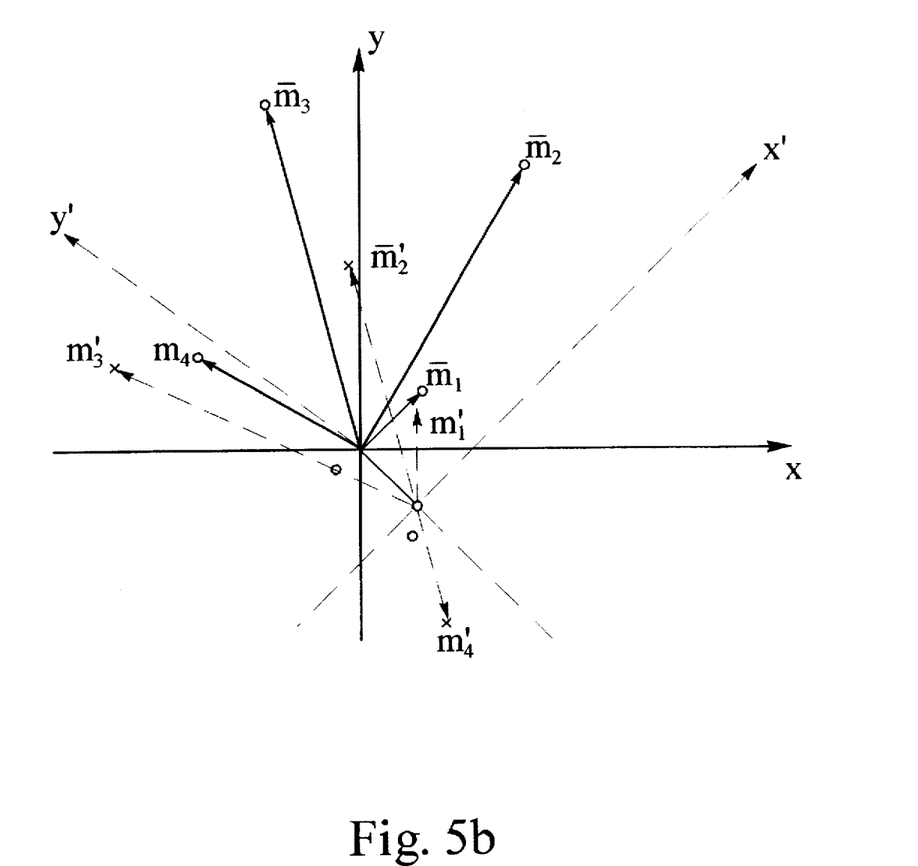
FIG. 5b illustrates the relative position of the reference line segments and the candidate line segments.

FIG. 5b illustrates the relative position of the two coordinate systems. After the origin and the axes of the two coordinate systems are aligned, the reference line segments are compared to the candidate line segments in step 81 to determine if the person seeking access to the protected area is entitled to obtain such access.

Figure 6:
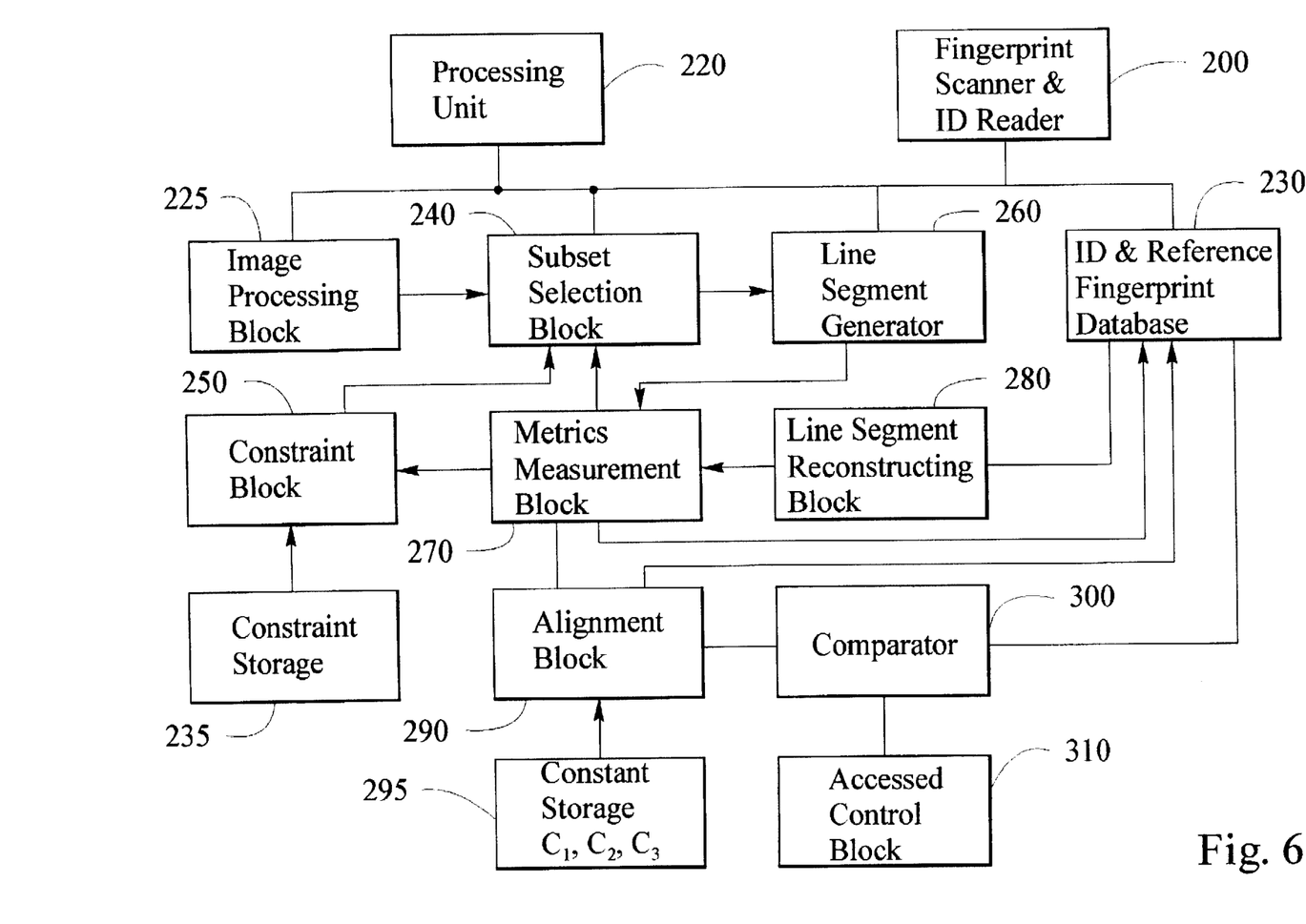
FIG. 6 is a block diagram of the longest line apparatus for fingerprint alignment.

FIG. 6 illustrates the block diagram of the apparatus for fingerprint recognition of this invention. A processing unit 200 is connected controls various blocks of the apparatus. Scanner 220 produces an image of a fingerprint. A reference storage block 230 (or a fingerprint database) stores the reference image. The image is further processed in image processing block 225 which ties the image to the reference coordinate system and inputs it to subspace selection block 240. Block 240 determines a subspace for each line based on data from the constraint block 250, which calculates the constraints for the respective subspace. Constraint block 250 uses constraints C and $C_\theta$ pre-stored in memory 235 and the metrics of the contributing line segments, as discussed above. A line segment generator 260 receives information regarding the subspace and generates each line segment on the respective subspace, according to the constraints associated with the subspace. The metrics for each line segment generated in block 260 are determined in metrics measurement block 270. The metrics of each line segment are then stored in the reference fingerprint storage, and also applied to constraints block 250, as needed.

When a live fingerprint is scanned in reader 220, the reference line segments metrics are extracted from the reference storage 230. The candidate image is input to block 225 for processing in the candidate coordinate system. The candidate image and the reference metrics are applied to reconstruction block 180 which generates the candidate line segments on the candidate image.

The metrics of the candidate image are determined in metrics measurement block 270 and forwarded to alignment block 290 for further processing. Constants C1 to C3, stored in block 295 are used by alignment block 290 as discussed above, to allow for a degree of liberty for the reconstructed line segments. In block 290 the reference coordinate system is displaced and rotated over the candidate coordinate system. The aligned metrics are compared with the reference metrics in comparator 300. If the metrics of the reference and candidate line segments are generally equivalent, the person's identity is validated. If access to a protected area is the ultimate scope, the person is given access to the protected area by a suitable access permitting means, illustrated by block 310 in broken lines on FIG. 6. If the system did not find a match of the person's fingerprint with the reference fingerprint, the identification has failed.

While the invention has been described with reference to particular example embodiments, further modifications and improvements which will occur to those skilled in the art, may be made within the purview of the appended claims, without departing from the scope of the invention in its broader aspect.

What is claimed is:

1. A method for storing a set of reference metrics for a fingerprint in a reference storage, comprising the steps of:

scanning said fingerprint to obtain a reference image in a reference coordinate system;

selecting a first and a second constraint and defining a space on said fingerprint image;

defining a first subspace on said space and generating a first line segment within said first subspace in accordance with a third constraint;

measuring a first reference set of metrics for said first line segment, determining a fourth constraint using said first constraint and said first reference set of metrics, and defining a second subspace on said space according to said fourth constraint;

generating a second line segment within said second subspace according to said third constraint;

measuring a second reference set of metrics for said second line segment, determining a fifth constraint from said second reference sets of metrics and said first constraint, and defining a third and a fourth subspace on said space according to said fourth and fifth constraints;

generating a third line segment within said third subspace according to said second, fourth, and fifth constraints, and said first set of reference metrics;

generating a fourth line segment within said fourth subspace according to said second, fourth, and fifth constraints, and said second set of reference metrics; and storing said first to fourth reference sets of metrics in said reference storage.

2. A method as claimed in claim 1, wherein said third constraint comprises a maximum detecting routine for selecting a line segment with a maximum length for said respective subspace.

3. A method as claimed in claim 1, wherein said fourth constraint comprises a subspace exterior to a circular area around the median point of said first line segment, having a radius equal to said first constraint.

4. A method as claimed in claim 1, wherein said fifth constraint comprises a subspace exterior to a circular area around the median point of said second line segment having a radius equal to said first constraint.

5. A method as claimed in claim 1, wherein said first constraint is 10λ, where λ is the distance between two ridges of a fingerprint.

6. A method as claimed in claim 1, wherein said second constraint is a 30° angle.

7. A method as claimed in claim 1, wherein said subspace comprises the totality of grooves around a core zone of said reference image.

8. A method as claimed in claim 1, wherein each of said first to fourth reference set of metrics comprises the length of said respective first to fourth line segment, the angle between said respective line segment and x-axis of said reference coordinate system and the (x, y)-coordinates of the median point of said respective first to fourth line segment.

9. A method as claimed in claim 1, further comprising the step of scanning and processing a candidate fingerprint and preparing a candidate image in a candidate coordinate system, and reading a candidate ID associated with said candidate fingerprint.

* * * * *

UNITED STATES PATENT AND TRADEMARK OFFICE
CERTIFICATE OF CORRECTION

PATENT NO.   : 5,717,777
DATED        : February 10, 1998
INVENTOR(S)  : Wong et al.

It is certified that error appears in the above-identified patent and that said Letters Patent is hereby corrected as shown below:

Drawings,
Figure 1, is erroneous. Figure 1 should read as follows:

Column 3,
Line 44, "set &metrics" should read -- set of metrics --.

Column 7,
Line 64, "$C_{74}$" should read -- $C_\theta$ --.

Column 8,
Line 40,
"$\|L'^{,}_i\| - |L_i\| < C_1, i \in N$" should read -- $\|L'_i\| - |L_i\| < C_1, \quad i \in N$ --.

UNITED STATES PATENT AND TRADEMARK OFFICE
CERTIFICATE OF CORRECTION

PATENT NO.    : 5,717,777
DATED         : February 10, 1998
INVENTOR(S)   : Wong et al.

It is certified that error appears in the above-identified patent and that said Letters Patent is hereby corrected as shown below:

Column 9,
Line 1, "$\Delta \bar{x} = \dfrac{\sum_{i \in N}(\bar{m}_i - \bar{m}_i)}{N}$" should read -- $\Delta \bar{x} = \dfrac{\sum_{i \in N}(\bar{m}'_i - \bar{m}_i)}{N}$ --.

Signed and Sealed this

Twenty-fifth Day of February, 2003

JAMES E. ROGAN
*Director of the United States Patent and Trademark Office*